(12) United States Patent
Hasegawa et al.

(10) Patent No.: US 8,609,289 B2
(45) Date of Patent: Dec. 17, 2013

(54) FUEL CELL SYSTEM

(75) Inventors: Takahiko Hasegawa, Toyota (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 663 days.

(21) Appl. No.: 12/810,116

(22) PCT Filed: Dec. 11, 2008

(86) PCT No.: PCT/JP2008/072560
§ 371 (c)(1),
(2), (4) Date: Jun. 22, 2010

(87) PCT Pub. No.: WO2009/081756
PCT Pub. Date: Jul. 2, 2009

(65) Prior Publication Data
US 2010/0273072 A1  Oct. 28, 2010

(30) Foreign Application Priority Data
Dec. 25, 2007  (JP) .................. 2007-333017

(51) Int. Cl.
*H01M 8/04* (2006.01)
(52) U.S. Cl.
USPC ............ 429/430; 429/431; 429/432; 324/433
(58) Field of Classification Search
USPC .................... 429/430–432; 324/433
See application file for complete search history.

(56) References Cited

U.S. PATENT DOCUMENTS

| 2004/0106025 A1* | 6/2004 | Saito et al. ................ 429/23 |
| 2006/0029845 A1* | 2/2006 | Konoto et al. ............. 429/23 |
| 2009/0117427 A1* | 5/2009 | Manabe et al. ............ 429/23 |

FOREIGN PATENT DOCUMENTS

| JP | 2000-023490 A | 1/2000 |
| JP | 2004-364404 A | 12/2004 |
| JP | 2006-033934 A | 2/2006 |
| JP | 2006-217759 A | 8/2006 |
| JP | 2007-016794 A | 1/2007 |
| WO | WO 2006/104268 A1 | 10/2006 |
| WO | WO 2007/004718 | * 1/2007 |

* cited by examiner

*Primary Examiner* — Jonathan Crepeau
*Assistant Examiner* — James Lee
(74) *Attorney, Agent, or Firm* — Kenyon & Kenyon LLP

(57) ABSTRACT

Provided is a fuel cell system that can suitably control a voltage converter in response to a judgment that an abnormal condition occurs in a power detection unit that detects a power passing through the voltage converter. The fuel cell system has: a first power detection unit that estimates an effective value of a converter input power by multiplying the converter input power, which is obtained from a battery voltage and a battery current, by a converter efficiency; a second power detection unit that estimates a converter output power from a fuel cell voltage, a fuel cell current and a driving motor load power; and a third power detection unit that estimates a converter flowing power from a current of a reactor measured by a current sensor (shown in a separate drawing). The fuel cell system also has similar detection units for current, and using one of the detection units or a combination of some of them, specifies a malfunctioning sensor and prohibits correction of parameters.

7 Claims, 8 Drawing Sheets

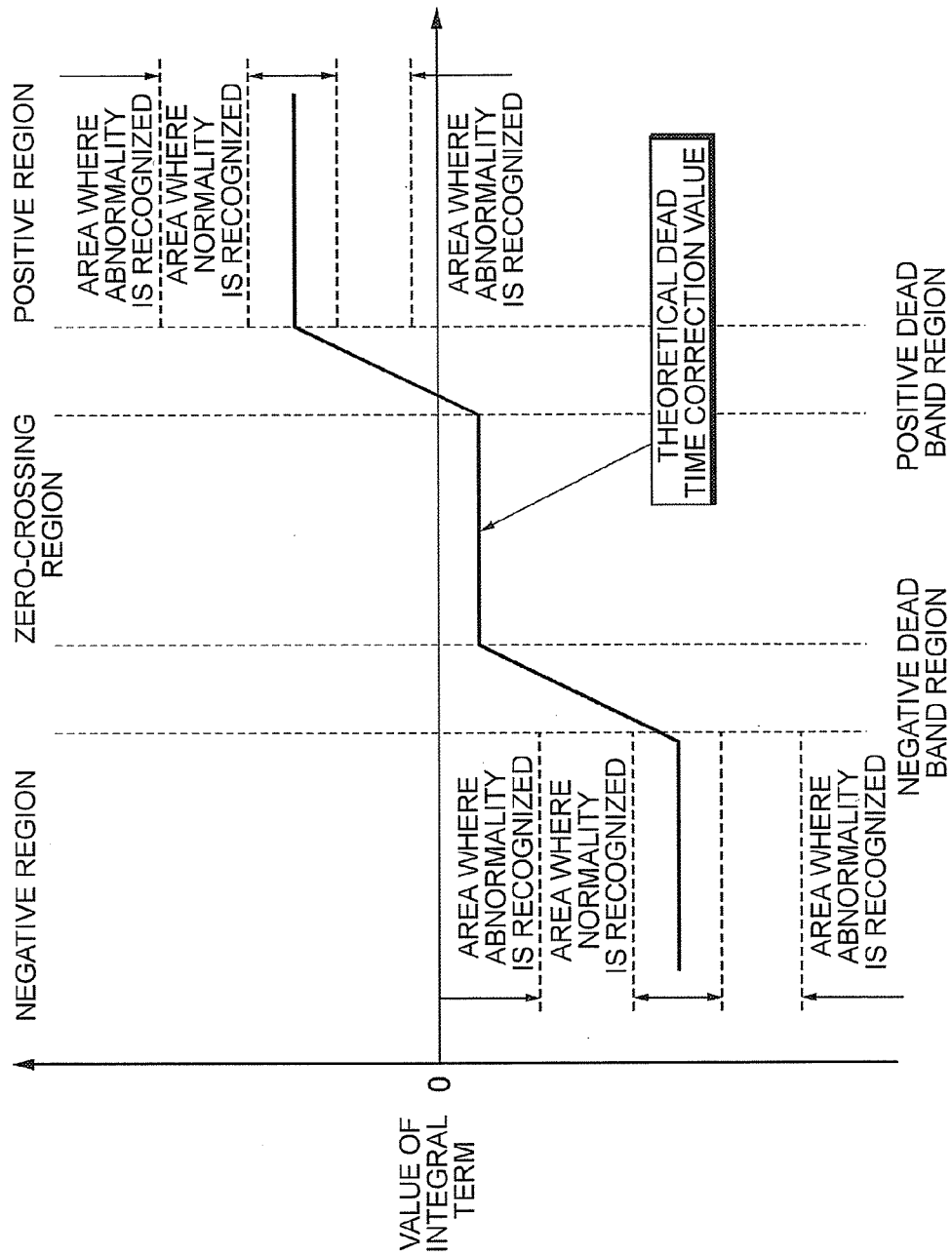

FIG. 8

| | FUNCTIONS | RELEVANT PARAMETERS | BATTERY VOLTAGE | BATTERY CURRENT | HIGH-VOLTAGE AUXILIARY APPARATUS LOSS | CONVERTER CURRENT A | CONVERTER CURRENT B | FC VOLTAGE | FC CURRENT | dINVERTER CURRENT |
|---|---|---|---|---|---|---|---|---|---|---|
| ACTIVE PHASE SWITCHING | CONVERTER INPUT POWER CALCULATION | CONVERTER PASSING POWER ESTIMATE | ○ | ○ | ○ | — | — | — | — | — |
| | | LOW-VOLTAGE AUXILIARY APPARATUS LOSS ERROR CORRECTION VALUE | — | — | — | — | — | ○ | ○ | ○ |
| | | CONVERTER INPUT POWER IN SINGLE-PHASE OPERATION | ○ | ○ | ○ | ○ | — | — | — | — |
| DEAD TIME CORRECTION | CURRENT STATE DETERMINATION | REACTOR CURRENT STATE | — | — | — | — | — | ○ | ○ | ○ |
| | DEAD TIME CORRECTION | INTEGRAL TERM | ○ | ○ | ○ | — | — | ○ | — | — |
| | INDUCTANCE CALCULATION | INDUCTANCE | ○ | — | — | — | — | ○ | ○ | ○ |
| PHASE-TO-PHASE CURRENT CORRECTION | CORRECTION AMOUNT CALCULATION | DUTY RATIO CORRECTION AMOUNT IN EACH PHASE | ○ | — | — | ○ | ○ | — | — | — |

A : PHASE-TO-PHASE CURRENT BETWEEN U-PHASE AND V-PHASE

B : PHASE-TO-PHASE CURRENT BETWEEN V-PHASE AND W-PHASE

US 8,609,289 B2

FUEL CELL SYSTEM

This is a 371 national phase application of PCT/JP2008/072560 filed 11 Dec. 2008, which claims priority to Japanese Patent Application No. 2007-333017 filed 25 Dec. 2007, the contents of which are incorporated herein by reference.

FIELD OF THE INVENTION

The present invention relates to a fuel cell system. More specifically, the invention relates to a hybrid fuel cell system that can suitably control a voltage converter (high-voltage converter) in response to a judgment that an abnormal condition occurs in a power detection unit that detects a power passing through the voltage converter.

BACKGROUND OF THE INVENTION

For fuel cell systems installed in electric vehicles, etc., in order to respond to a sudden change in load beyond the power-generating capacity of a fuel cell, a so-called hybrid fuel cell system provided with a load drive circuit and a battery has been developed, the hybrid fuel cell system being configured such that: the output voltage of the battery is increased or decreased through a voltage converter and then connected to the output terminal of the fuel cell; and the output of the battery can be supplied to a load device.

In this type of hybrid fuel cell system, various sensors for measuring the values of voltage, current or electric power are provided, in particular, for the voltage converter, and the values measured by those sensors are used for the system control. If an abnormal value is included in such measured values from the sensors, it would affect the system control, and might result in unfavorable conditions for the system operation.

In view of the above, the idea of calculating differences between the respective voltage values detected by the input-side and output-side voltage sensors of a voltage converter and the voltage sensor of a battery, analyzing the differences through comparison with each other, and thereby detecting an abnormal condition in the sensors and specifying which sensor is in an abnormal condition, is disclosed in, for example, Japanese laid-open patent publication No. 2004-364404 (see Patent Literature 1).

Patent Literature 1: Japanese laid-open patent publication No. 2004-364404

SUMMARY OF THE INVENTION

Technical Problem

Although the above-described conventional technique can detect an abnormal condition in a sensor and specify which sensor is in an abnormal condition as well, how the voltage converter should be treated in response to such judgment has not been considered. Various types of corrections may be carried out for the voltage converter, and the above-described conventional technique is silent about how a judgment that a sensor is in an abnormal condition should be reflected in such corrections.

Accordingly, an object of the invention is to provide a fuel cell system that can suitably control a voltage converter in response to a judgment that an abnormal condition occurs in a power detection unit that detects a power passing through the voltage converter.

Solution to Problem

In order to solve the above problem, the invention provides a fuel cell system having a voltage converter, the system including a power detection unit that detects a power passing through the voltage converter, wherein whether or not the power detection unit is in an abnormal condition is judged, and if it is judged that the power detection unit is in an abnormal condition, correction of a parameter used for control of the voltage converter is prohibited.

With this configuration, since correction of the relevant parameter is prohibited if it is judged that the power detection unit is in an abnormal condition, the reliability of the control parameters for controlling the system (especially, the voltage converter) can be enhanced.

The term "power detection unit" used in the invention refers to a broad idea that encompasses not only means or functions for detecting a power but also means or functions for detecting a current, and an "abnormal condition" in the "power detection unit" also includes the case where a detected current exhibits an abnormal value.

In the above fuel cell system, it is preferable that dead time correction for correcting a dead time that changes according to a change in direction of a reactor current in the voltage converter is prohibited if it is judged that the power detection unit is in an abnormal condition.

With this configuration, when the power detection unit is in an abnormal condition, an incorrect dead time correction based on the reactor current that may include an error is prevented, and accordingly, the reliability of the dead time correction operation can be improved.

In the above fuel cell system, it is preferable that the voltage converter is configured to be able to operate in a plurality of phases, and that correction of a phase-to-phase current value of the voltage converter is prohibited if it is judged that the power detection unit is in an abnormal condition.

With this configuration, since correcting a phase-to-phase current value is prohibited if the power detection unit is in an abnormal condition, the reliability of the phase-to-phase current value correction can be improved.

In the above fuel cell system, it is preferable that the voltage converter is configured to be able to operate in a plurality of phases, and that switching of active phases in the voltage converter is prohibited if it is judged that the power detection unit is in an abnormal condition.

With this configuration, since the control of switching active phases in the voltage converter is prohibited if the power detection unit is in an abnormal condition, the accuracy of the power passing through the voltage converter can be maintained, and a more stabilized multi-phase operation can be continued.

Also, the above fuel cell system may preferably have a plurality of the above-described power detection units, and compare the powers detected by each of the power detection units with each other so as to judge whether or not any of the power detection units is in an abnormal condition.

With this configuration, since the results of power detection by several power detection units are compared with each other, a power detection unit in an abnormal condition can be specified with high reliability.

Also, in the above fuel cell system, it is preferable that the powers detected by each of the power detection units are compared with each other, and that if it is judged that any of the power detection units has an error with respect to the power, the error is corrected.

With this configuration, for the power detection unit that has been judged as having an error, the error is corrected, and accordingly, as long as an error in the power detection unit is within the range of correctable errors, the relevant parameter can be corrected by using that power detection unit. As a result, it is possible to attain a fuel cell system having, as a whole, a robust, fail-safe feature.

Also, in the above fuel cell system, it is preferable that the powers detected by the plurality of power detection units are: a primary side passing power detected by a power detection sensor provided on a primary side of the voltage converter; a secondary side passing power detected by a power detection sensor provided on a secondary side of the voltage converter; and a reactor passing power that is estimated in accordance with a reactor current detected by a current detection sensor serially connected to a reactor of the voltage converter.

With this configuration, a plurality of power detection units is provided in a technically simple and less expensive way.

The invention also provides a fuel cell system having: a fuel cell; a load device; a voltage converter connected between the fuel cell and the load device; a power detector that detects a power passing through the voltage converter; and a controller, wherein the controller judges whether or not the power detector is in an abnormal condition, and prohibits correction of a parameter used for control of the voltage converter if it is judged that the power detector is in an abnormal condition.

In the fuel cell system of the invention, it is preferable that a plurality of the above-described power detection units is provided, and that the controller compares the powers detected by each of the power detectors with each other, so as to judge whether or not any of the power detectors is in an abnormal condition.

The invention also provides a method for controlling a fuel cell system having a voltage converter, the method including the steps of: judging whether or not a power detection unit that detects a power passing through the voltage converter is in an abnormal condition; and prohibiting correction of a parameter used for control of the voltage converter if it is judged that the power detection unit is in an abnormal condition.

Advantageous Effects of Invention

According to the invention, if it is judged that power detection or current detection is in an abnormal condition, correcting the relevant parameter is prohibited, and accordingly, the reliability of the control parameters for control of the system (especially, the voltage converter) can be enhanced.

BRIEF DESCRIPTION OF DRAWINGS

FIG. 7 is an explanatory diagram illustrating values of the integral term of a reactor current state and abnormality judgment threshold ranges.

FIG. 8 is a correspondence table regarding sensors used for correcting parameters in a DC-DC converter and correction parameters for each control function.

DETAILED DESCRIPTION

A preferred embodiment of the invention will be described below with reference to the attached drawings.

In this embodiment of the invention, the invention is applied to a hybrid fuel cell system to be installed in a mobile object, such as an electric vehicle.

(System Configuration)

Figure 1:
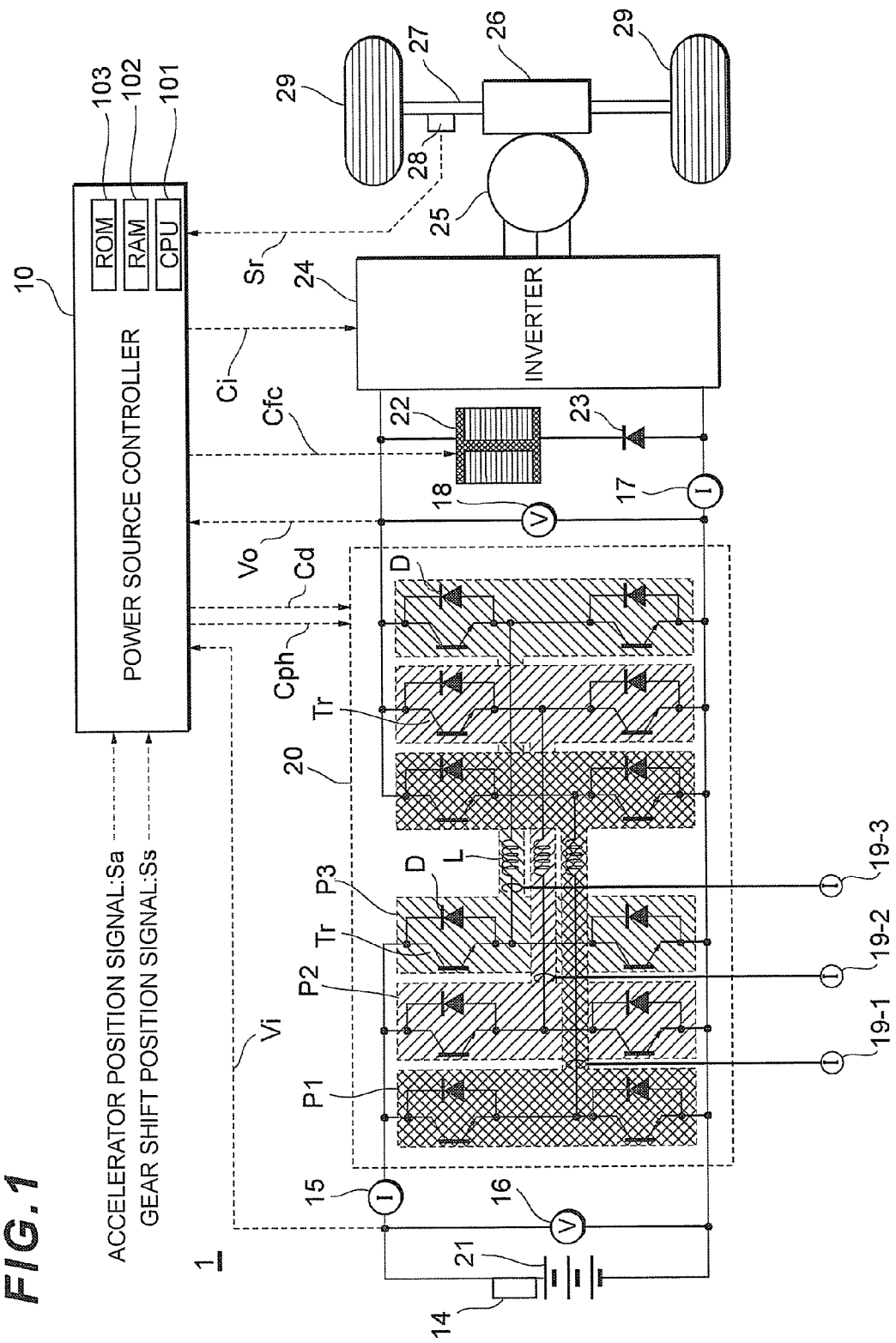
FIG. 1 is an overall system view of a fuel cell system according to an embodiment of the invention.

FIG. 1 is an overall system view of a fuel cell system according to an embodiment of the invention.

A hybrid fuel cell system according to this embodiment (hybrid fuel cell system 1) has a DC-DC converter 20 pertaining to a voltage converter of the invention, a high-voltage battery 21 which corresponds to a power storage device, a fuel cell 22, a reverse current preventing diode 23, an inverter 24, a traction motor 25, a differential 26, a shaft 27, wheels 29, and a power source controller 10.

The high-voltage battery 21 is formed of a plurality of stacked and serially-connected chargeable/dischargeable battery units, such as nickel-hydrogen cells, so that a predetermined voltage can be output. Provided at the output terminal of the high-voltage battery 21 is a battery computer 14 that can communicate with the power source controller 10, the battery computer 14 maintaining the state of charge of the high-voltage battery 21 at a proper value that would not result in overcharge or overdischarge, and functioning to maintain safety if a failure occurs in the high-voltage battery.

The DC-DC converter 20 is a bidirectional voltage converter that converts (increases or decreases the voltage of) a power input to a primary side (input side, battery 21 side) to make the power have a voltage value different from the primary side and outputs it to a secondary side (output side, fuel cell 22 side), and conversely converts a power input to the secondary side to make the power have a voltage different from the secondary side and outputs it to the primary side. In this embodiment, by increasing a direct current output voltage (e.g., around 200 V) of the high-voltage battery 21 to a higher direct current voltage (e.g., around 500 V), the traction motor 25 can be driven with low current and high voltage, thereby reducing power loss resulting from power supply, and enabling the traction motor 25 to be a high power motor. The DC-DC converter 20 employs a three-phase operation system, and for a specific circuit system, the DC-DC converter 20 has a circuit configuration of a three-phase bridge type converter. The three-phase bridge type converter circuit configuration is formed of a combination of a circuit portion similar to an inverter, which temporarily converts an input direct current voltage to an alternating current, and a portion that rectifies the alternating current again and converts it to a different direct current voltage. As shown in FIG. 1, the converter is formed by connecting three phases (P1, P2, P3) in parallel both between the primary side input terminals and between the secondary side output terminals, each phase being a two-tiered structure of parallel connections of a switching device Tr and a rectifier D. The intermediate points of the respective two-tiered structures on the primary side and the secondary side are connected via a reactor L. For the switching device Tr, for example, an IGBT (Insulated Gate Bipolar Transistor) may be used, and for the rectifier D, a diode may be used. The DC-DC converter 20 is configured to be switched at adjusted moments so that the phase difference between each phase becomes 120° ($2\pi/3$).

The reactor L of the DC-DC converter 20 is serially connected to a current sensor 19.

The DC-DC converter 20 is configured such that which phase is active can arbitrarily be changed based on a phase switching control signal Cph from the power source controller 10. In this embodiment, a three-phase operation and a single-phase operation are switched to each other based on an actual measurement load or load prediction.

Also, when the DC-DC converter 20 temporarily converts a direct current to an alternating current by the three-phase bridge type circuit configuration, the duty ratio of the alternating current can be changed in response to a duty ratio control signal Cd from the power source controller 10. Since the duty ratio of the alternating current changes the effective value of power passing through the converter, it consequently changes the output power and output voltage of the converter. Quick output adjustment is allowed by changing the duty ratio. Temporarily changing the duty ratio as described above is particularly effective in a transitional period between the control operations constantly performed by the converter.

Note that an input current of the DC-DC converter 20 can be measured by a current sensor 15, and an input voltage Vi can be measured by a voltage sensor 16. Also, an output current of the DC-DC converter 20 can be measured by a current sensor 17, and an output voltage Vo can be measured by a voltage sensor 18. Also, the reactor L in each phase is provided with a current sensor 19 (19-1, 19-2, 19-3) which is configured to be able to detect a current flowing through the reactor.

During a low-load operation or a braking operation, the DC-DC converter 20 can perform a regenerative operation in which the traction motor 25 is used in an opposite manner as a generator to generate power and a direct current voltage is converted from the secondary side to the primary side of the converter so as to charge the high-voltage battery 21.

The fuel cell stack 22 is constituted by a plurality of stacked and serially-connected unit cells. The unit cell has a configuration in which a polymer electrolyte membrane, etc., is sandwiched between two electrodes, a fuel electrode and an air electrode, to form an assembly of MEA and the MEA is further sandwiched between separators for supplying fuel gas and oxidant gas. In the anode, an anode catalyst layer is provided on a porous support layer, and in the cathode, a cathode catalyst layer is provided on a porous support layer.

The fuel cell stack 22 has a fuel gas supply system, an oxidant gas supply system and a coolant supply system, which are not shown in the drawing, and can generate an arbitrary amount of power by controlling the fuel gas supply and the oxidant gas supply according to control signals Cfc from the power source controller 10.

The inverter 24 is an inverter for a driving motor, and converts a high-voltage direct current which has been boosted by the DC-DC converter 20 to a three-phase alternating current with a 120-degree difference between each phase. As with the converter 20, the current in the inverter 24 is controlled according to an inverter control signal Ci from the power source controller 10.

The traction motor 25 serves as the main power of the electric vehicle of this embodiment, and is also configured to generate regenerative power during deceleration. The differential 26 is a decelerator, decelerating a high-speed rotation of the traction motor 25 to a predetermined rotation frequency and rotating the shaft 27 to which tires 29 are provided. The shaft 27 has a wheel speed sensor 28, whereby a wheel speed pulse Sr can be output to the power source controller 10.

The power source controller 10 is a computer system for controlling the electric power source, and has, for example, a central processing unit (CPU) 101, RAM 102, and ROM 103. The power source controller 10 is programmed to perform overall control of the electric power source by: receiving, as inputs, an accelerator position signal Sa, a gear shift position signal Ss, a wheel speed signal Sr from the wheel speed sensor 28, and other signals from various sensors; obtaining the amount of power generation by the fuel cell stack 22 and the torque in the traction motor 25 according to the operational state; calculating power balance in the fuel cell stack 22, traction motor 25 and high-voltage battery 21; and counting losses in the DC-DC converter 20 and inverter 24. Also, the power source controller 10 can recognize a power flowing through the primary side of the DC-DC converter 20 from an input current detected by the current sensor 15 and an input voltage detected by the voltage sensor 16, and can also recognize a power flowing through the secondary side of the DC-DC converter 20 from an output current detected by the current sensor 17 and an output voltage detected by the voltage sensor 18. The power source controller 10 can also recognize a current passing through each phase of the DC-DC converter 20 based on a passing current detected by the current sensor 19.

Figure 2:
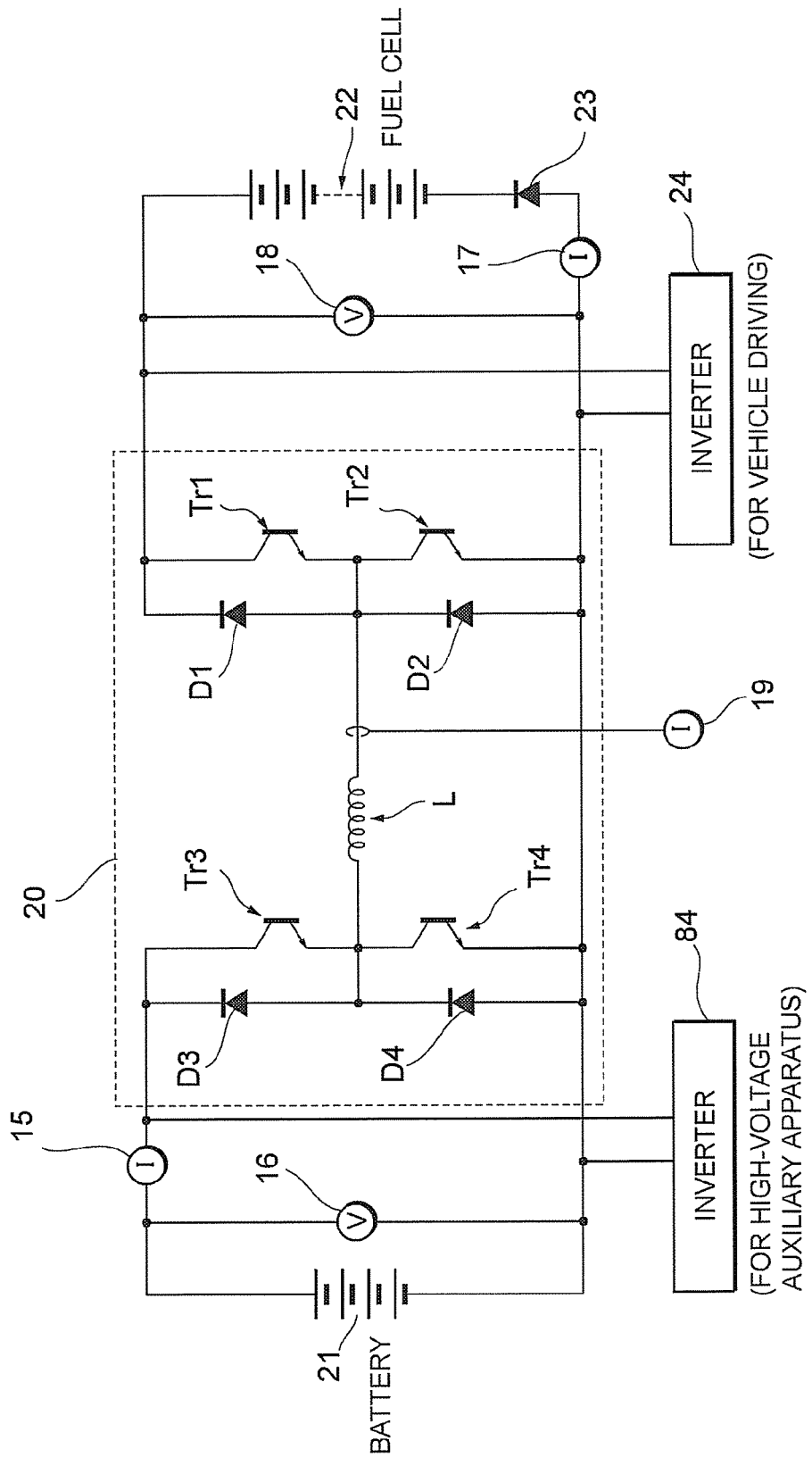
FIG. 2 is a configuration diagram of a load drive circuit, mainly depicting a single phase circuit constituting one phase of a DC-DC converter 20.

FIG. 2 is a configuration diagram of a load drive circuit, extracting one phase of the circuit of the DC-DC converter 20, which makes the configuration easy to understand.

As shown in FIG. 2, (one phase of) the DC-DC converter 20 has switching devices Tr1-Tr4, diodes D1-D4 and a reactor L, and on the side of the output of the fuel cell 22 (secondary side), a parallel-connection circuit of the switching device Tr1 and the diode D1 and a parallel-connection circuit of the switching device Tr2 and the diode D2 are connected in series (in a two-tiered form). Also, on the side of the output of the high-voltage battery 21 (primary side), a parallel-connection circuit of the switching device Tr3 and the diode D3 and a parallel-connection circuit of the switching device Tr4 and the diode D4 are connected in series (in a two-tiered form).

The above circuit configuration of the DC-DC converter 20 is formed of a combination of a circuit portion having an inverter function for temporarily converting an input direct current voltage to an alternating current and a circuit portion for rectifying the resulting alternating current again and converting it to a different direct current voltage.

In the DC-DC converter 20, there is one contact point of the above-described serial connection on the side of the output of the fuel cell 22, and another contact point on the side of the output of the battery 21, the two contact points being electrically connected via the reactor L, and the current passing through the reactor L can be measured by the current sensor 19.

In this embodiment, an inverter 84 (not shown in FIG. 1) for a high-voltage auxiliary apparatus is connected to the input side of the DC-DC converter 20, and the inverter 24 for the driving motor traction motor 25 is connected to the output side.

Figure 3:
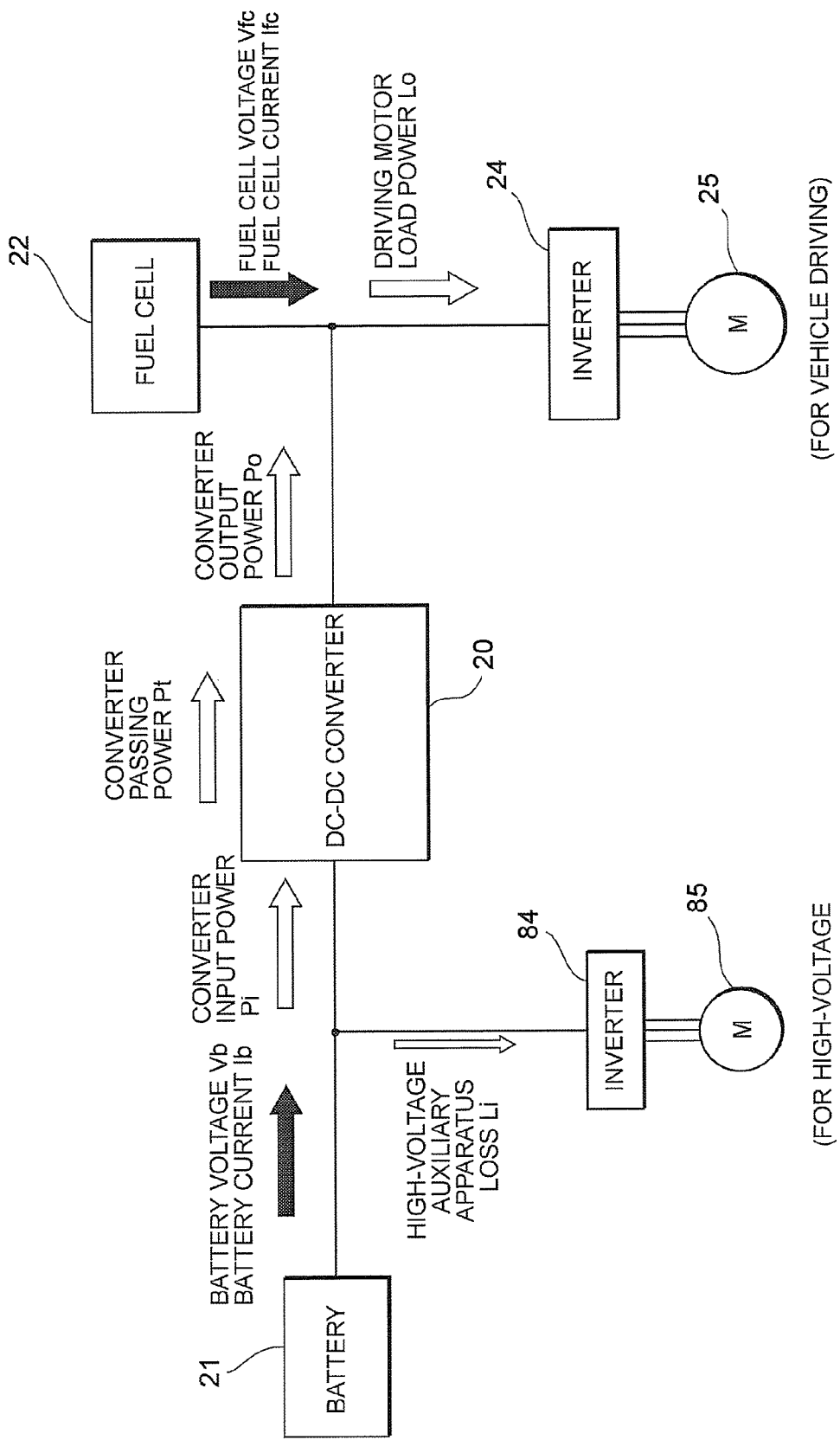
FIG. 3 is a circuit block diagram for explaining the flow of current, voltage and power in major paths of a circuit composed mainly of the DC-DC converter 20.

FIG. 3 is a circuit block diagram for explaining the flow of current, voltage and power in the major paths of a circuit composed mainly of the DC-DC converter 20.

FIG. 3 shows one example of the flow of power, in which power is supplied to the traction motor 25 from the battery 21 and from the fuel cell 22. As shown in FIG. 3, the output power from the high-voltage battery 21 is divided to a drive power for the inverter 84 and an input power to the DC-DC converter 20, and from the inverter 84, a drive power (auxiliary apparatus loss) is supplied to a high-voltage auxiliary apparatus 85. The output power Po of the DC-DC converter 20 is output to the traction motor 25 through the driving motor inverter 24.

While the fuel cell 22 stops generating power, for example, in an intermittent operation mode, only the power from the battery 21 is supplied to the driving motor inverter 24 via the DC-DC converter 20.

On the other hand, if the fuel cell 22 has spare power generation capacity, the output power from the fuel cell is supplied to the driving motor inverter 24, and is also supplied in the direction opposite to the outline arrows in FIG. 3, from the secondary side to the primary side of the DC-DC converter 20, resulting in the battery 21 being charged with the power after subtracting a high-voltage auxiliary apparatus loss for the high-voltage auxiliary apparatus inverter 84.

Also, during a braking operation, the regenerative power generated by the traction motor 25 is supplied in a similar way to the above, from the secondary side to the primary side of the DC-DC converter 20 via the inverter 24, resulting in the battery 21 being charged with the power after subtracting a high-voltage auxiliary apparatus loss for the high-voltage auxiliary apparatus inverter 84.

Here, although there is an internal loss in the DC-DC converter 20, the input power Pi, the passing power Pt, and the output power Po of the DC-DC converter 20 should be substantially equal to each other. If any of the above powers do not match the other powers, it can be assumed that the sensor that detected the mismatching power has a problem, and the power values detected by that sensor need to be corrected.

Furthermore, if any of the detected powers exhibits a value that exceeds an allowable range, it can be assumed that the sensor that detected the exceeding power is in an abnormal condition, and suitable measures should be taken for such a condition.

Next, the operation for detecting an error and abnormal condition in a power detection unit according to this embodiment will be described.

(Operation)

Referring to FIG. 3, the characteristic operation of the fuel cell system 1 of this embodiment will be explained.

The input power Pi of the DC-DC converter 20 can be estimated as a power obtained by subtracting the high-voltage auxiliary apparatus loss Li for the high-voltage auxiliary apparatus inverter 84 from the battery output power Pb, which is obtained from the battery current Ib detected by the current sensor 15 and the battery voltage Vb detected by the voltage sensor 16. The output power Po of the DC-DC converter 20 can be estimated as a power obtained by subtracting the fuel cell output power Pfc, which is obtained from the fuel cell current Ifc detected by the current sensor 17 and the fuel cell voltage Vfc detected by the voltage sensor 18, from the driving motor load power Lo. The passing power Pt can be estimated by performing a calculation using a specific arithmetic expression based on the input voltage of the DC-DC converter 20, the passing current It detected by the current sensor 19, the reactor, an inductor loss in synchronization control, etc., or by referring to a specific relational table (two-dimensional map table). The above power measurement values are each used in logic functions for controlling the DC-DC converter 20 (functions carried out by the power source controller 10, more specifically, the respective logic functions of phase switching, dead time correction and phase-to-phase current correction).

If the power measurement values, which are the results of power measurement using the above-indicated sensors (such power measurement corresponding to the power detection unit in the present invention), include an error, and if the error is within a threshold value defining a specific range of errors, the DC-DC converter 20 is controlled without correcting the measurement values. If the error is not within the above threshold value, it is considered that an abnormal condition has been recognized (diagnosed), and the processing to be performed when recognizing an abnormal condition is performed (for example, the system operation is stopped). However, some measurement values, even if they include an error not exceeding the threshold value, may affect the DC-DC converter 20 and cause a failure in the DC-DC converter 20 when they are used in the above-described respective logic functions. Accordingly, in the fuel cell system 1 of this embodiment, if an abnormal condition that could affect the DC-DC converter 20 and cause a failure in the DC-DC converter 20 when used in each logic is detected in a sensor, the power source controller 10 prohibits, as a fail-safe feature, correcting the relevant parameters, even if the error in the sensor does not exceed the above threshold value for abnormality judgment. More specifically, the power source controller 10 carries out treatments of, for example, prohibiting correction of calculation values obtained in each logic function.

Figure 4:
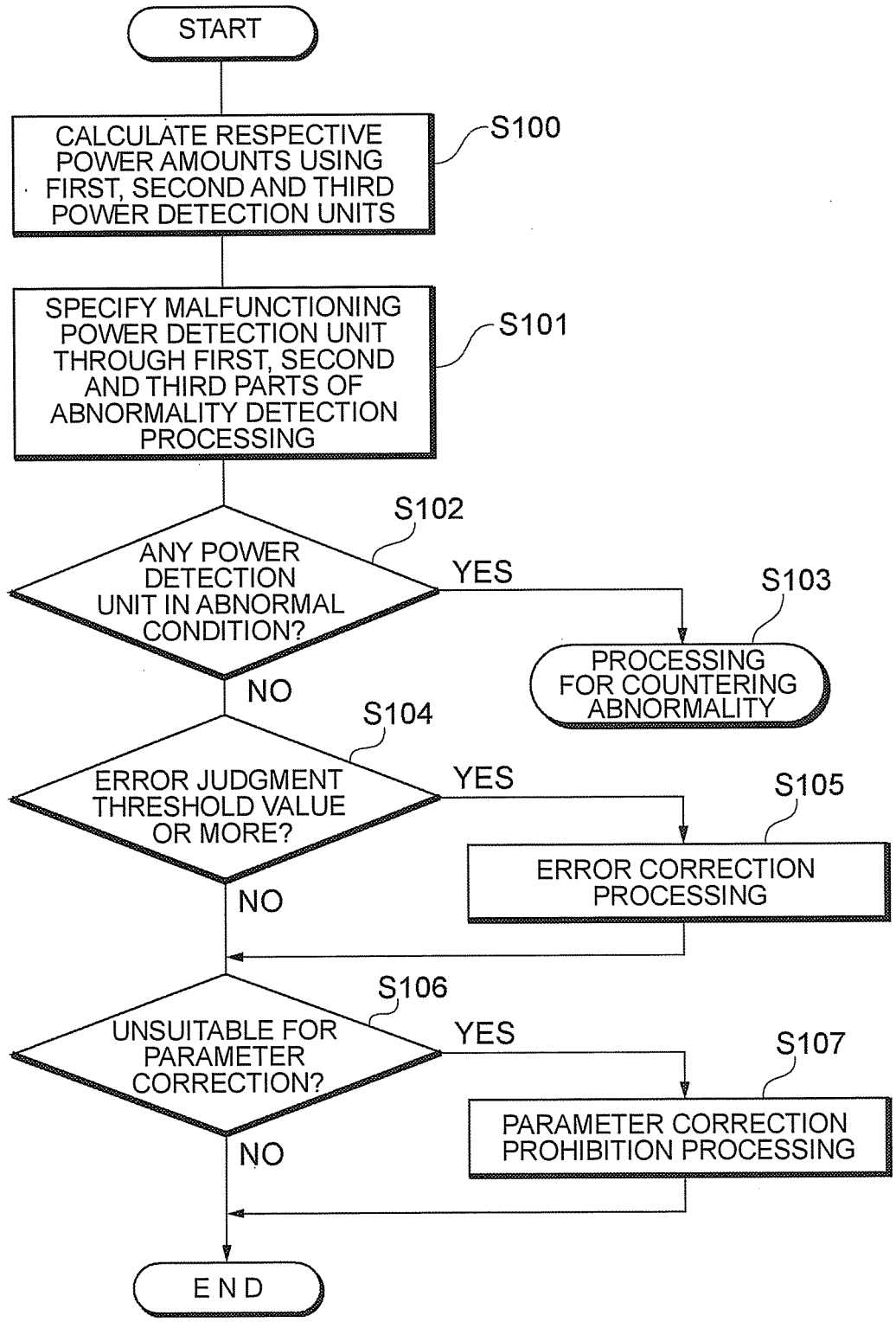
FIG. 4 is a flowchart for explaining the basic operations performed when an abnormal condition is detected according to the invention.

Next, abnormality detection processing using some of the first, second and third power detection units in combination will be described referring to the flowchart shown in FIG. 4.

First, as shown in step S100, a power measurement value is calculated in each of the first, second and third power detection units.

In the first power detection unit, the converter input power Pi, i.e., the effective power (electric power) passing through the converter, is estimated. The converter input power Pi is a power obtained by subtracting the high-voltage auxiliary apparatus loss Li for the high-voltage auxiliary apparatus inverter 84 from the battery output power Pb, which is calculated from the battery current Ib detected by the current sensor 15 and the battery voltage Vb detected by the voltage sensor 16. Thus, an estimate of the converter input power Pi (=estimate of the converter passing effective power) is obtained by multiplying the value: (battery voltage Vb×battery current Ib−high-voltage auxiliary apparatus loss Li) by the converter efficiency ((battery voltage Vb×battery current Ib−high-voltage auxiliary apparatus loss Li)×converter efficiency).

In the second power detection unit, the power passing through the converter (namely, the converter passing power Pt) is estimated. The converter passing power Pt can be estimated by calculation using a specific arithmetic expression based on the input voltage of the DC-DC converter 20, the passing current It detected by the current sensor 19, the reactor, an inductor loss in synchronization control, etc., or by referring to a specific relational table (two-dimensional map table).

In the third power detection unit, the power output from the converter (namely, the converter output power Po) is estimated. The converter output power Po can be calculated as follows:

$$\text{Converter output power } Po = \text{Driving motor load power } Lo - \text{Fuel cell voltage } Vo \times \text{Fuel cell current } Io.$$

If one of the above first, second and third power detection units is used alone, the power source controller 10 judges whether or not an abnormal condition occurs in the power detection unit by comparing an error included in the detected power measurement value with a predetermined abnormality judgment threshold value (which is different from an error judgment threshold value used for error judgment) defining the range of abnormal power measurement values. If it is judged that an abnormal condition occurs, correcting the parameters used for controlling the converter is prohibited. For example, a dead time correction for correcting a dead time that changes according to a change in direction of the reactor current in the converter is prohibited if it is judged that an abnormal condition occurs in the power detection unit. Also, if the converter is configured to be able to operate in multiple phases, correcting a phase-to-phase current value of the converter is prohibited if it is judged that an abnormal condition occurs in the power detection unit. In that case, switching active phases in the converter may also be prohibited.

Next, moving to step S101, a malfunctioning power detection unit is specified by the abnormality detection processing which involves combining some of the power measurement values calculated in the first, second and third power detection units.

In a first part of the abnormality detection processing, the power source controller 10 compares the converter input power Pi on the battery side (namely, the above-described converter passing effective power), detected by the first power detection unit, with the converter output power Po detected by the third power detection unit, thereby predicting the sensors that could possibly malfunction.

In a second part of the abnormality detection processing, the power source controller 10 compares the converter passing power Pt, detected by the second power detection unit through calculation from the reactor current It, with the converter output power Po detected by the third power detection unit, thereby predicting the sensors that could possibly malfunction.

In a third part of the abnormality detection processing, the power source controller 10 compares the converter passing power detected by the second power detection unit through calculation from the reactor current, with the converter passing effective power on the battery side, detected by the first power detection unit, thereby predicting the sensors that could possibly malfunction.

Finally, as a result of combining any two of the above first, second and third parts of the abnormality detection processing, or as a result of combining all of the above first, second and third parts of the abnormality detection processing, the power source controller 10 specifies the malfunctioning sensor. To be more specific, when using two or more of the above first, second and third parts of the abnormality detection processing, the power source controller 10 compares the powers detected by the respective power detection units with each other and judges whether or not an abnormal condition occurs in any of the power detection units.

As a result, if it is judged that an abnormal condition occurs in any of the power detection units (sensors) (YES), the power source controller 10 moves to step S103 and performs processing to be performed after an abnormal condition is detected. For example, the power source controller 10 carries out fail-safe operations, such as prohibiting the use of the concerned power detection unit or giving notice of such abnormality.

If it is judged that an abnormal condition does not occur in any of the power detection units (NO), the power source controller 10 moves to step S104 and compares the differences between the power measurement values with a predetermined error judgment threshold value. If it is judged that there is an error that is the error judgment threshold value or more (YES), the power source controller 10 moves to step S105 and performs error correction processing for the power detected by the power detection unit that is expected to have an error. If the differences between the power measurement values are smaller than the error judgment threshold value (NO), the measurement values of the power detection units are considered to be normal values, and the processing ends.

As described above, if the power value measured by each of the power detection units is an abnormal value, predetermined processing for countering such abnormality can be carried out. However, some power values, even if they are not found abnormal, may not be suited for use in correcting certain parameters for the various logic functions performed in the converter. Thus, in step S106, the power source controller 10 judges whether or not various parameters calculated based on the detected power measurement values are within predetermined threshold values. If the various parameters are judged as exceeding the threshold values (YES), the power source controller 10 moves to step S107 and prohibits corrections using those parameters thereafter. If the various parameters are within the threshold values (NO), it is considered that there is no problem, and the processing ends.

As stated above, by comparing the power values measured by several power detection units with each other, a particular power detection unit (sensor) that creates an error can be specified, and if the power value exhibits an abnormal value, predetermined processing for countering such abnormality can be carried out. Also, if the power value is not an abnormal value, but exceeds the threshold value of errors, an error correction can be performed. Also, if the power value itself measured by the power detection units has not been judged as being abnormal, but if the power value is not suitable for use in correcting certain parameters, correction of the parameters is prohibited. As a result, a failure can be prevented from occurring in the control functions for the converter due to the influence of errors in the power detection units.

Example 1

Next, a specific example of the processing for prohibiting correction of parameters will be described.

"Converter active phase switching," "phase-to-phase current correction," and "dead time correction" are hereby described as examples of the control (logic) functions for the DC-DC converter 20. In this example, in the above control functions, correction of parameters is prohibited according to the level of errors in the power detection units.

The "converter active phase switching" is a control for switching a plurality of phases to each other depending on the amount of passing power in view of the conversion efficiency of the converter. This active phase switching includes, for example, switching a multi-phase operation into a single-phase operation. In a single-phase operation, all the current passing through the converter passes through one phase circuit (see FIG. 2). Thus, during a single-phase operation, margin (allowance for operation) is relatively small, and if a value of passing current includes an error, an unfavorable condition may occur in a component such as, for example, a component being destroyed. When carrying out a single-phase operation, the operation should be controlled based on accurately measured powers, and an excess power passing due to an operation based on powers including errors has to be prevented. Accordingly, in this example, the existence of a condition suitable for the phase switching control is determined by judging the level of errors in each sensor in accordance with whether or not the auxiliary apparatus loss error correction value, the difference in converter phase-to-phase currents, and the difference in converter passing power estimates are each within the allowable values. The measurement values used for judging the existence of a condition suitable for the phase switching processing are: a battery voltage Vb; a battery current Ib; a high-voltage auxiliary apparatus loss (actual measurement value) Li; a fuel cell output voltage Vfc; a fuel cell output current Ifc; and a current Io of the inverter 24.

The "phase-to-phase current correction" is correction processing performed when there is a difference between each of the phase-to-phase currents of the DC-DC converter 20, the processing calculating the amount of correction of the duty ratio in each phase of the converter so as to solve the above difference. The measurement values used for judging the existence of a condition suitable for the phase-to-phase current correction are: a phase-to-phase current IA between the U-phase and the V-phase; a phase-to-phase current IB between the V-phase and the W-phase; a battery voltage Vb; a battery current Ib; a high-voltage auxiliary apparatus loss (actual measurement value) Li; a fuel cell output voltage Vfc; a fuel cell output current Ifc; and a current Io of the inverter 24.

The "dead time correction" is processing for correcting a dead time that changes according to a change in direction of the current passing through the DC-DC converter 20.

The term "dead time" used herein refers to a period when, in a converter having switching devices in a bridge configuration as with the DC-DC converter 20 of this embodiment, the two-tiered switching devices which constitute a bridge are both in an ON state. For example, in FIG. 2, the "dead time" refers to a period when the switching devices Tr1 and Tr2 are both in an ON state or when the switching devices Tr3 and Tr4 are both in an ON state.

To be more specific about the "dead time correction," since different switching devices are involved in the generation of a dead time depending on the direction of the reactor current in the converter, the integral term corresponding to a set-point of the duty ratio control (PID feedback control) needs to be changed depending on such different switching devices involved, and the "dead time correction" means this change of the integral term. The measurement values used for judging the existence of a condition suitable for the dead time correction are: a battery voltage Vb; a battery current Ib; a high-voltage auxiliary apparatus loss (actual measurement value) Li; a fuel cell output voltage Vfc; a fuel cell output current Ifc; and a current Io of the inverter 24.

Figure 5:
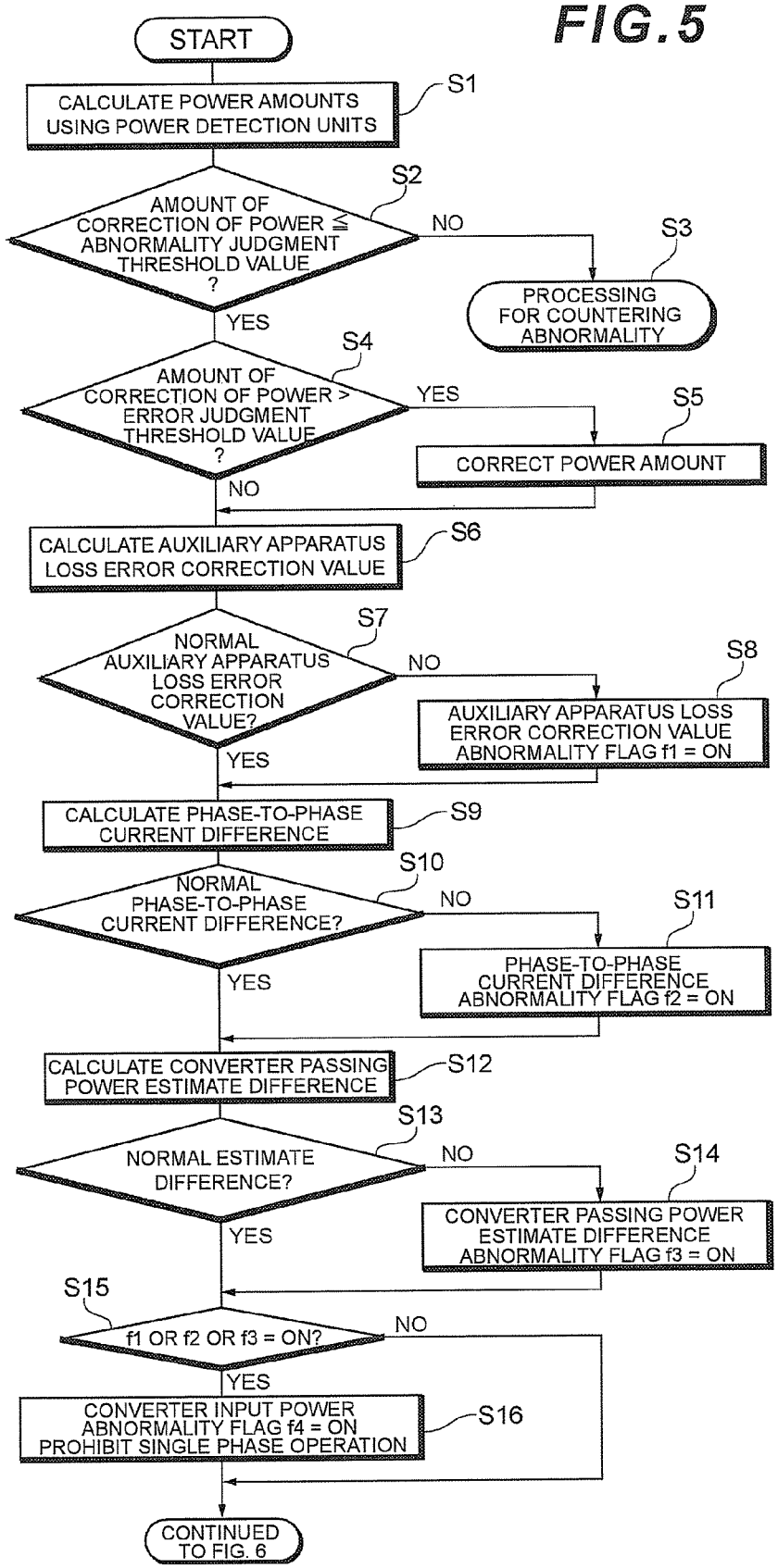
FIG. 5 is a flowchart for explaining an abnormality detection operation in an example (illustrating the first half of the operation).
Figure 6:
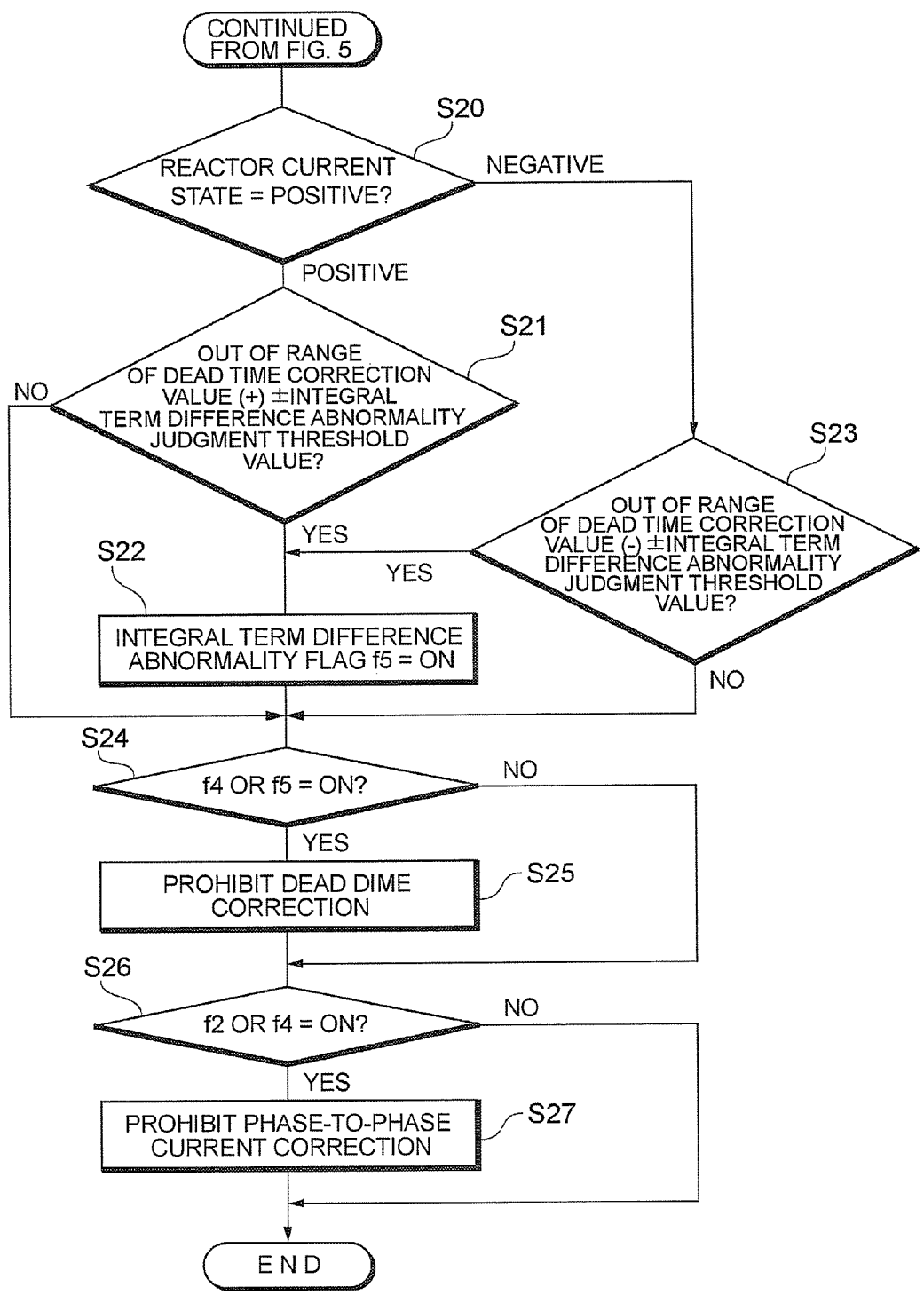
FIG. 6 is a flowchart for explaining an abnormality detection operation in an example (illustrating the last half of the operation).

FIGS. 5 and 6 show a flowchart schematically illustrating the processing of this example.

First, in step S1 in FIG. 5, the power source controller 10 estimates power measurement values using the first, second and third power detection units. The specific way of estimating power measurement values are as already explained above. The power source controller 10 calculates the respective power measurement values using the first, second and third power detection units.

Next, moving to step S2, the power source controller 10 compares the amount of correction of power with a predetermined abnormality judgment threshold value defining the range of abnormality. As a result, if the amount of correction of power is judged as exceeding the abnormality judgment threshold value (NO), the power source controller 10 moves to step S3, and performs certain processing to be performed when an abnormal condition occurs in a sensor. On the other hand, if the amount of correction of power is judged as being within the abnormality judgment threshold value (YES), the power source controller 10 moves to step S4.

In step S4, the power source controller 10 specifies the malfunctioning power detection unit by combining and matching any two of the power measurement values and also combining and matching all the results of the first, second and third parts of the abnormality detection processing. After that, the power source controller 10 judges whether or not the difference between the power measurement value of the power detection unit that has been judged as malfunctioning and the normal value is a predetermined error judgment threshold value or more. If the difference is judged as exceeding the error judgment threshold value (YES), the power source controller 10 moves to step S5, and corrects the power measurement value including an error. For example, assuming that the power measurement values of the other power detection units are correct, a factor relative to those correct power measurement values is determined, and any subsequent power measurement value obtained by the power detection unit concerned is processed by multiplying it by the determined factor. On the other hand, if the difference is judged as being within the error judgment threshold value (NO), the power source controller 10 moves to step S6.

In step S6, the power source controller 10 calculates an auxiliary apparatus loss error correction value. In order to calculate the auxiliary apparatus loss error correction value, the power source controller 10 first obtains an estimate Pi of the converter passing power. Herein, values indicated by a code with "flt" are "filtered values." If there is a possibility that a measurement value includes noise, such a measurement value may be treated by low-pass filtering to remove a high-pass component or by band-pass filtering to allow only a specific-pass component to pass, and the "filtered value" is a value resulting from such filtering. An estimate Pi of the converter passing power is obtained as follows:

$$Piflt=(Vbflt \times Ibflt-Li) \times \eta,$$

wherein Vbflt, Ibflt, Li, and η represent a filtered value of a battery voltage Vb, a filtered value of a battery current Ib, a high-voltage auxiliary apparatus loss (actual measurement value), and the converter efficiency, respectively.

An auxiliary apparatus loss error correction value Ld is obtained as follows:

$$Ld=Piflt-((Io-Ifc) \times Vfcflt)flt,$$

wherein Piflt, Io, Ifc, and Vfcflt represent a filtered value of the above-obtained converter passing power estimate Pi, a current of the inverter (actual measurement value), an output current of the fuel cell (actual measurement value), and a filtered value of an output voltage of the fuel cell.

In step S7, the power source controller 10 compares the auxiliary apparatus loss error correction value Ld obtained by the above calculation with a threshold value Vth1 for judging abnormality in the auxiliary apparatus loss error correction value. More specifically, the power source controller 10 judges whether or not the following is met:

Auxiliary apparatus loss error correction value Ld≥Abnormality judgment upper limit threshold value Vth1H; or Auxiliary apparatus loss error correction value Ld≤Abnormality judgment lower limit threshold value Vth1L.

As a result, if the auxiliary apparatus loss error correction value Ld is judged as being out of the range of the abnormality judgment threshold values (NO), there is a high possibility that an error occurs in sensor(s) detecting the fuel cell output voltage, the fuel cell output current, and/or the inverter current. Thus, in step S8, the power source controller 10 sets a flag f1 indicating abnormality in the auxiliary apparatus loss error correction value to an ON state. On the other hand, if the auxiliary apparatus loss error correction value Ld is judged as being within the abnormality judgment threshold values (YES), the power source controller 10 moves to step S9.

In step S9, if the converter is in a single-phase operation, the power source controller 10 calculates a difference between each of the phase-to-phase currents, which are detected by the current sensors in each phase for detecting the converter current when each phase alone is active. If the converter is not in a single-phase operation, this step is skipped. The difference between each of the phase-to-phase currents is calculated as the absolute value of the sum of a phase-to-phase current IA and a phase-to-phase current IB (=|IA+IB|), IA being a phase-to-phase current between the U-phase and the V-phase, and IB being a phase-to-phase current between the V-phase and the W-phase. The power source controller 10 moves to step S10, and compares the calculated difference between each of the phase-to-phase currents with an abnormality judgment threshold value Vth2. More specifically, the power source controller 10 judges whether or not the following is met:
Phase-to-phase current difference $|IA+IB|\geq$Phase-to-phase current difference upper limit threshold value $Vth2H$; or Phase-to-phase current difference $|IA+IB|\leq$Phase-to-phase current difference lower limit threshold value $Vth2L$.

As a result, if it is judged that the difference between each of the phase-to-phase currents is out of the range of the abnormality judgment threshold values (NO), there is a high possibility that the sensor measuring the current in the A-phase or B-phase of the converter has an error. Accordingly, in step S11, the power controller 10 sets a flag f2 indicating abnormality in the difference between each of the phase-to-phase currents to an ON state. On the other hand, if the difference between each of the phase-to-phase currents falls within the range of the abnormality judgment threshold values (YES), the power source controller 10 moves to step S12.

In step S12, the power source controller 10 calculates a difference $\Delta P$ in converter passing power estimates. The difference $\Delta P$ in converter passing power estimates is a difference between the converter passing power Pi obtained in step S6 above and an input power P1 of the converter in a single-phase operation, Pi and P1 being values when the converter current sensors have no error. The input power P1 of the converter in a single-phase operation is calculated as follows:

$P1$=Maximum of $IA$ and $IB\times$Duty$\times Vb$ wherein Maximum of IA and IB is the maximum value of the phase-to-phase currents IA and IB in the converter, Duty is a target duty ratio, and Vb is a battery voltage (actual measurement value). Moving to step S13, the power source controller 10 compares the difference $\Delta P$ in converter passing power estimates (=|Pi−P1|) with a threshold value Vth3 for judging abnormality in the difference in converter passing power estimates. More specifically, the power source controller 10 judges whether or not a predetermined condition is met with respect to the following formula:

$|Pi-P1|\geq$Threshold value $Vth3$ for the difference in converter passing power estimates.

The predetermined condition is, for example, the condition where the difference in converter passing power estimates continues to be the threshold value or greater for a specific period of time, or the condition where the difference in converter passing power estimates has been detected as being the threshold value or greater a specific number of times. Those conditions may apply to other judgments using the threshold values. As a result of the above, if it is judged that the difference $\Delta P$ in converter passing power estimates continues to exceed the abnormality judgment threshold value for a specific period of time (NO), there is a high possibility that sensor(s) for measuring the battery voltage, battery current, or high-voltage auxiliary apparatus loss have an error. Accordingly, in step S14, the power source controller 10 sets a flag f3 indicating abnormality in the difference in converter passing power estimates to an ON state. On the other hand, if the difference $\Delta P$ in converter passing power estimates is within the abnormality judgment threshold value, or if the time when the difference $\Delta P$ in converter passing power estimates exceeds the threshold value is less than the specific period of time (YES), the power source controller 10 moves to step S15.

If it is found in the above abnormality judgments that there is abnormality in the error calculation of the auxiliary apparatus loss error correction value, the difference between each of the phase-to-phase currents, or the difference in converter passing power estimates, it means that there is abnormality in the input power of the converter, and if the converter operates in a single phase in this situation, an unfavorable condition may occur due to errors. Thus, in step S 15, the power source controller 10 judges whether or not the flag f1 indicating abnormality in the auxiliary apparatus loss error correction, the flag f2 indicating abnormality in the phase-to-phase current difference, or the flag f3 indicating abnormality in the difference in converter passing power estimates is in an ON state. As a result, if any one of the flags is in an ON state (YES), the power source controller 10 moves to step S16, sets a flag f4 indicating abnormality in the converter input power to an ON state, and prohibits a subsequent single-phase operation. On the other hand, if none of the flags are in an ON state, the power source controller 10 resets the flag f4 indicating abnormality in the converter input power to an OFF state, and moves to step S20.

In and after step S20 in FIG. 6, the existence of a condition suitable for the dead time correction is judged. More specifically, if the state of the reactor current It has been positive (the current flowing in the direction from the primary side to the secondary side) or negative (the current flowing in the direction from the secondary side to the primary side) for a specific period of time, and if the integral term for the dead time correction has a difference from a certain dead time correction value, the difference being a predetermined threshold value Vth4 for judging abnormality in the integral term difference or more, it can be determined that the fixed value for the dead time correction fluctuates. Thus, the dead time correction is prohibited.

Here, the state of the reactor current is represented by the direction of the reactor current. As the basis for this, the reactor current average value is first obtained as follows:

Reactor current average value=Converter input power $Pi$/(Battery voltage(actual measurement value) $Vb\times$Target duty ratio Duty).

An inductance is obtained by referring to a pre-stored inductance two-dimensional mapping table using the reactor current average value as a key. Using the obtained inductance, the amount of reactor current change is obtained as follows:

Amount of reactor current change=Battery voltage (actual measurement value)$Vb\times$Carrier cycle time/Inductance.

Also, the integral term for the dead time correction is obtained as $\Sigma$(filtered value of the fuel cell output voltage command value−fuel cell output voltage (actual measurement value) Vfc).

More specifically, if it is judged in step S20 that the reactor current is maintained in a positive (plus) state for a specific period of time (YES), the power source controller 10 moves to step S21, and compares the value of the integral term with the sum of the positive dead time correction value (+) and a predetermined threshold value Vth4 for judging abnormality in the integral term difference. If the following:

Integral term$\geq$Dead time correction value(+)+Abnormality judgment threshold value $Vth4$ for the integral term difference; or Integral term≤Dead time correction value(+)−Abnormality judgment threshold value $Vth4$ for the integral term difference is met (YES), the power source controller 10 moves to step S22, and sets a flag f5 indicating abnormality in the integral term difference to an ON state. On the other hand, if the above conditions are not met (NO), the power source controller 10 moves to step S24, keeping the integral term difference abnormality flag f5 in an OFF state.

Also, if it is judged in step S20 that the reactor current is maintained in a negative (minus) state for a specific period of time (NO), the power source controller 10 moves to step S23, and compares the value of the integral term with the sum of the negative dead time correction value (−) and a predetermined threshold value $Vth4$ for judging abnormality in the integral term difference. If the following:

Integral term≥Dead time correction value(−)+Abnormality judgment threshold value $Vth4$ for the integral term difference; or Integral term≤Dead time correction value(−)−Abnormality judgment threshold value $Vth4$ for the integral term difference is met (YES), the power source controller 10 moves to step S22, and sets the integral term difference abnormality flag f5 to an ON state. On the other hand, if the above conditions are not met (NO), the power source controller 10 moves to step S24, keeping the integral term difference abnormality flag f5 in an OFF state.

In the above judgment, the state of the reactor current may be incorrectly estimated if there is abnormality in the converter input power, so the dead time correction should not be performed in that condition. Also, if the difference of the integral term from the dead time correction value continues to be the threshold value or greater for a specific period of time while the reactor current is stably maintained in a state for a specific period of time, there is a possibility that the fixed value for the dead time correction fluctuates, so the dead time correction should not be performed.

Thus, in step S24, the power source controller 10 judges whether or not the converter input power abnormality flag f4 or the integral term difference abnormality flag f5 is in an ON state. As a result, if at least one of the abnormality flags is in an ON state (YES), the power source controller 10 judges that the condition is not suitable for the dead time correction, moves to step S25, and prohibits the dead time correction. On the other hand, if both the converter input power abnormality flag f4 and the integral term difference abnormality flag are in an OFF state, the power source controller 10 stops prohibiting the dead time correction.

FIG. 7 shows the relationship between values of the integral term and the abnormality judgment threshold ranges for the integral term difference in the dead time correction. According to the above-described control, the dead time correction is carried out when the integral term falls within the range in which normality can be recognized.

Also, in the above judgment, a value of inductance in the converter may be incorrectly estimated if there is an error in the converter input power, so the phase-to-phase current correction should not be performed in that condition. Also, if the difference between each of the phase-to-phase currents in a single phase operation (|IA+IB|) is abnormal in that it is not within the threshold values, it means that the sensors for detecting a current in each phase have an error, so the phase-to-phase current correction should not be performed in that condition.

Thus, in step S26, the power source controller 10 judges whether or not the converter input power abnormality flag f4 or the phase-to-phase current difference abnormality flag f2 is in an ON state. As a result, if at least one of the abnormality flags is in an ON state (YES), the power source controller 10 judges that the condition is not suitable for the phase-to-phase current correction, moves to step S27, and prohibits the phase-to-phase current correction. On the other hand, if both the converter input power abnormality flag f4 and the phase-to-phase current difference abnormality flag f2 are in an OFF state, the power source controller 10 stops prohibiting the phase-to-phase current correction.

Other Modifications

The present invention is not limited to the above-described embodiment, and may be applied with modifications in various ways.

For example, in the above-described embodiment, active phase switching, phase-to-phase current correction and dead time correction are described as examples of the objects for which correction of parameters is prohibited, but the invention is not limited to the above. If correcting parameters in the condition where the relevant sensor has an error results in making a subsequent control after the correction unstable, such correction of parameters may suitably be prohibited according to the abnormality judgment processing of this invention.

For example, FIG. 8 shows a correspondence table regarding sensors used for correcting parameters in a DC-DC converter and correction parameters for each control function. As shown in this table, each control function has various parameters to be corrected, each parameter having corresponding sensor(s) used in calculating that parameter. If the measurement value of the sensor has an error, the corresponding parameter will also include an error. Thus, it would be better to prohibit correcting that parameter. In that case, the corresponding control function will be stopped. Since different converters have different parameters and sensors from those in the correspondence table in FIG. 8, the sensors that would be affected and the corresponding parameter corrections to be restricted may be determined according to the environment of each converter.

In the above embodiment, a three-phase bridge type converter is described as one example, but the circuit configuration is not limited to the above. The invention can be applied to any voltage converter that is driven in multiple phases and configured to change the phases independently, and such voltage converter can operate so that the advantageous effects of the invention can be brought about.

The invention claimed is:

1. A fuel cell system having a voltage converter, the system comprising:
a plurality of power detection units, each unit detecting a power passing through the voltage converter,
a control unit programmed to compare the power detected by each of the plurality of power detection units being compared with each other, so as to judge whether or not any of the power detection units is in an abnormal condition;
the control unit further programmed to prohibit dead time correction for correcting a dead time that changes according to a direction of a reactor current in the voltage converter if it is judged that any of the power detection units is in an abnormal condition; and
the powers detected by the plurality of power detection units being:

a primary side passing power detected by a power detection sensor provided on a primary side of the voltage converter;

a secondary side passing power detected by a power detection sensor provided on a secondary side of the voltage converter; and a reactor passing power that is estimated based on the reactor current detected by a current detection sensor serially connected to a reactor of the voltage converter.

2. The fuel cell system according to claim 1, the voltage converter being configured to be able to operate in a plurality of phases; and correction of a phase-to-phase current value of the voltage converter being prohibited if it is judged that the power detection unit is in an abnormal condition.

3. The fuel cell system according to claim 1, the voltage converter being configured to be able to operate in a plurality of phases; and switching of active phases in the voltage converter being prohibited if it is judged that the power detection unit is in an abnormal condition.

4. The fuel cell system according to claim 1, the powers detected by each of the plurality of power detection units being compared with each other, and if it is judged that any of the power detection units has an error with respect to the power, the error is corrected.

5. A fuel cell system comprising:

a fuel cell;

a load device;

a voltage converter connected between the fuel cell and the load device;

a plurality of power detectors, each of the power detectors detecting a power passing through the voltage converter; and a controller programmed to compare the power detected by each of the plurality of power detectors with each other and judges whether or not any of the power detectors is in an abnormal condition, the controller further programmed to prohibit dead time correction for correcting a dead time that changes according to a direction of a reactor current in the voltage converter, if it is judged that any of the power detectors is in an abnormal condition; and the powers detected by the plurality of power detectors being:

a primary side passing power detected by a power detection sensor provided on a primary side of the voltage converter;

a secondary side passing power detected by a power detection sensor provided on a secondary side of the voltage converter; and a reactor passing power that is estimated based on the reactor current detected by a current detection sensor serially connected to a reactor of the voltage converter.

6. The fuel cell system according to claim 5, the power detected by each of the plurality of power detectors being compared with each other, and if it is judged that any of the power detectors has an error with respect to the power, the error being corrected.

7. A method for controlling a fuel cell system having a voltage converter and a plurality of power detection units for detecting a power passing through the voltage converter, the method comprising:

detecting the power using each of the plurality of power detection units;

judging whether or not any of the power detection units is in an abnormal condition by comparing the powers detected by each of the plurality of power detection units with each other; and prohibiting dead time correction for correcting a dead time that changes according to a direction of a reactor current in the voltage converter if it is judged that any of the power detection units is in an abnormal condition, the powers detected in the step of detecting the power being:

a primary side passing power detected by a power detection sensor provided on a primary side of the voltage converter;

a secondary side passing power detected by a power detection sensor provided on a secondary side of the voltage converter; and a reactor passing power that is estimated based on a reactor current detected by a current detection sensor serially connected to a reactor of the voltage converter.

* * * * *